United States Patent
Ashe et al.

(10) Patent No.: US 12,203,486 B2
(45) Date of Patent: Jan. 21, 2025

(54) MOUNTING A FLANGED VACUUM PUMP TO A VACUUM SYSTEM

(71) Applicant: Edwards Vacuum LLC, Sanborn, NY (US)

(72) Inventors: Willie Ashe, Hillsboro, OR (US); Sean David Tischler, Hillsboro, OR (US); Gregory Ryan Le Mon, Hillsboro, OR (US); Brian Matthew Layng, Hillsboro, OR (US)

(73) Assignee: Edwards Vacuum LLC, Sanborn, NY (US)

( * ) Notice: Subject to any disclaimer, the term of this patent is extended or adjusted under 35 U.S.C. 154(b) by 0 days.

(21) Appl. No.: 17/905,793

(22) PCT Filed: Mar. 9, 2021

(86) PCT No.: PCT/IB2021/051936
§ 371 (c)(1),
(2) Date: Sep. 7, 2022

(87) PCT Pub. No.: WO2021/181257
PCT Pub. Date: Sep. 16, 2021

(65) Prior Publication Data
US 2023/0116457 A1 Apr. 13, 2023

(30) Foreign Application Priority Data
Mar. 10, 2020 (GB) ...................................... 2003456

(51) Int. Cl.
*F16L 23/028* (2006.01)
*F04D 19/04* (2006.01)
(Continued)

(52) U.S. Cl.
CPC ......... *F04D 29/644* (2013.01); *F04D 19/042* (2013.01); *F16L 23/024* (2013.01);
(Continued)

(58) Field of Classification Search
CPC ..... F16L 23/024; F16L 23/036; F16L 37/113; F16L 37/107; F16L 37/24; F16L 37/252;
(Continued)

(56) References Cited

U.S. PATENT DOCUMENTS 382,107 A * 5/1888 Pfister ................... F16L 37/252
285/358
622,313 A * 4/1899 Woodvine ............. F16L 37/252
285/82

(Continued)

FOREIGN PATENT DOCUMENTS

CN 107542984 A 1/2018
CN 206831004 U 1/2018
(Continued)

OTHER PUBLICATIONS

PCT Notification of Transmittal of the International Search Report and the Written Opinion of the International Searching Authority, or the Declaration and PCT International Search Report dated Jun. 7, 2021 for corresponding PCT application Serial No. PCT/IB2021/051936, 5 pages.
(Continued)

*Primary Examiner* — David Bochna
(74) *Attorney, Agent, or Firm* — Theodore M. Magee; Westman, Champlin & Koehler, P.A.

(57) ABSTRACT

A vacuum pump comprises an inlet flange for connecting to a vacuum chamber, where the inlet flange comprises a plurality of apertures for receiving a plurality of protruding fixing elements extending from the vacuum chamber. The protruding fixing elements comprise an enlarged retaining portion at an end remote from the vacuum chamber and a fastener receiving portion having at least one radial dimension that is smaller than a corresponding dimension of the enlarged retaining portion. A fastening mechanism is provided that comprises a plurality of slots each extending from
(Continued)

a same side of a plurality of apertures. The fastening mechanism is configured to be rotatable between a mounting position in which the apertures are aligned with the protruding fixing elements and a sealing position in which the slots are aligned with the protruding fixing elements.

22 Claims, 9 Drawing Sheets

(51) Int. Cl.
  *F04D 29/64* (2006.01)
  *F16L 23/024* (2006.01)
  *F16L 23/036* (2006.01)
  *F16L 23/16* (2006.01)

(52) U.S. Cl.
  CPC ......... *F16L 23/0283* (2013.01); *F16L 23/036* (2013.01); *F16L 23/16* (2013.01)

(58) Field of Classification Search
  CPC .... F16L 37/2445; F16L 37/248; F04D 19/042
  See application file for complete search history.

(56) References Cited

U.S. PATENT DOCUMENTS

| | | | | |
|---|---|---|---|---|
| 872,463 | A * | 12/1907 | Schwabe | F16L 37/252 285/95 |
| 904,200 | A * | 11/1908 | Harris | F16L 37/252 285/396 |
| 1,148,824 | A * | 8/1915 | Boje, Jr. | F16L 37/248 285/368 |
| 2,160,354 | A * | 5/1939 | Evans | F16L 37/248 285/73 |
| 2,819,028 | A * | 1/1958 | Moore | E03C 1/266 285/361 |
| 3,185,503 | A * | 5/1965 | Angle | F16L 37/24 285/361 |
| 4,271,865 | A * | 6/1981 | Galloway | F16L 37/36 251/89.5 |
| 6,442,769 | B1 | 9/2002 | Phillips | |
| 11,441,718 | B2 * | 9/2022 | Jorgensen | F16L 23/036 |
| 2005/0047905 | A1 * | 3/2005 | Kabasawa | F04D 19/042 415/90 |
| 2006/0024184 | A1 * | 2/2006 | Nakamura | F04D 19/042 417/423.4 |
| 2017/0239823 | A1 * | 8/2017 | Bellandi | F16L 37/252 |

FOREIGN PATENT DOCUMENTS

| | | |
|---|---|---|
| CN | 207394191 U | 5/2018 |
| EP | 1837521 A1 | 9/2007 |
| WO | 2020061614 A1 | 4/2020 |

OTHER PUBLICATIONS

PCT Written Opinion dated Jun. 7, 2021 for corresponding PCT application Serial No. PCT/IB2021/051936, 5 pages.
British Examination Report dated Aug. 7, 2020 and Search Report dated Aug. 6, 2020 for corresponding British application Serial No. GB2003456.7, 6 pages.

* cited by examiner 10  50    38

30  88

88 22 30

88

MOUNTING A FLANGED VACUUM PUMP TO A VACUUM SYSTEM

CROSS-REFERENCE TO RELATED APPLICATION

This application is a Section 371 National Stage Application of International Application No. PCT/IB2021/051936 filed Mar. 9, 2021, and published as WO 2021/181257 A1 on Sep. 16, 2021, the content of which is hereby incorporated by reference in its entirety and which claims priority of British Application No. 2003456.7, filed Mar. 10, 2022.

FIELD

The field of the invention relates to mounting a flanged vacuum pump to a vacuum system such as a vacuum chamber.

BACKGROUND

Mounting flanged vacuum pumps to vacuum systems can be complicated, as they should be mounted in a substantially fluid tight manner and where the systems are in a confined space there is limited access. Conventionally pumps such as turbomolecular pumps are mounted to the system such as a vacuum chamber in a semiconductor tool by a plurality of bolt holes arranged around the circumference of the flange. These holes receive bolts that screw into corresponding holes around the vacuum chamber outlet allowing the pump to be fixed to the system in a fluid-tight manner. These pumps are often located in restricted spaces that are difficult and ergonomically dangerous to work in. Furthermore, such components may need to be swapped periodically as they degrade or require cleaning. The swapping of such components is time consuming, awkward and can be dangerous. It would be desirable to provide a simpler way of mounting flanged vacuum pumps to a vacuum system.

The discussion above is merely provided for general background information and is not intended to be used as an aid in determining the scope of the claimed subject matter. The claimed subject matter is not limited to implementations that solve any or all disadvantages noted in the background.

SUMMARY

A first aspect comprises a vacuum pump comprising: an inlet flange for connecting to a vacuum chamber, said inlet flange comprising a plurality of apertures for receiving a plurality of protruding fixing elements extending from said vacuum chamber, said protruding fixing elements comprising an enlarged retaining portion at an end remote from said vacuum chamber and a fastener receiving portion having at least one radial dimension that is smaller than a corresponding dimension of said enlarged retaining portion; a fastening mechanism comprising a plurality of slots each extending from a same side of a plurality of apertures; wherein said fastening mechanism is configured to be rotatable between a mounting position in which said apertures are aligned with said protruding fixing elements and a sealing position in which said slots are aligned with said protruding fixing elements.

The inventors of the present invention recognised that fitting flanged vacuum pumps to vacuum systems in the conventional manner using a plurality of bolts arranged around the circumference of the flange, requires access to each of the bolts and requires each of the bolts to be separately tightened. In systems which are space restricted such as where vacuum pumps are fitted to vacuum systems this can be challenging, particularly in semiconductor fabs where pumps are mounted in tight spaces and sometimes in challenging conditions.

The first aspect provides a pump that is configured to be mounted to protruding fixing elements extending from a vacuum chamber. The protruding fixing elements are configured such that they have a retaining end portion remote from the vacuum chamber which is enlarged compared to the intermediate portion of the protruding elements which has at least one dimension that is smaller than a corresponding dimension of the retaining end portions.

The protruding elements may be bolts attached to holes in the vacuum chamber, or they may be studs extending from the vacuum chamber either welded in place or as an integral part of the vacuum chamber outlet.

The protruding elements may have a circular cross-section with the retaining end portion having a larger cross section than the middle fastener receiving portion or it may have some other shape.

This arrangement allows the bolts to be attached to the vacuum chamber once, while the pump can be mounted on and removed from the bolts without the need to undo them. This is done with the use of a fastening mechanism that may be mounted to the pump by wrapping it around an outer surface adjacent to the flange or the fastening mechanism may be part of the flange. Where it is a separate component it is mounted so that it can rotate with respect to the pump, with the bolts moving within the slots.

In this way, the flanged pump is mounted by a simple motion of sliding the pump onto the bolts and then rotating the pump or at least a portion of the fastening mechanism. This provides a much simpler mechanism of mounting and detaching the flanged pump to the vacuum system that does not require access around the pump and can be performed in two relatively simple moves.

In some embodiments, at least a portion of a surface of said fastening mechanism surrounding each of said slots is sloped, such that said at least a portion of said fastening mechanism is thinner closer to said aperture and thicker closer to an other end of said slot, movement of said protruding fixing elements along said slots from said aperture at said mounting position to said sealing position pushing said pump towards said vacuum system.

The pump is to be mounted on a vacuum system and therefore it should be mounted in a fluid tight manner. In order to improve the sealing between the flange and the other components, in some embodiments the slot comprises a sloped surface such that rotation of the fastening mechanism exerts a force on the flange biasing the pump towards the vacuum system.

In some embodiments, a surface of said retaining portion of said protruding fixing elements extending radially beyond said fastener receiving portion is sloped, an angle of said slope corresponding to an angle of said sloped surface surrounding said slots.

Where there is a sloped surface surrounding the sides of the slot then it may be advantageous to angle a surface of the retaining portion of the protruding fixing element that extends beyond the fastening receiving portion and rests on the slot such that the two slopes are aligned and the protruding fixing element is supported along a greater surface area of the retaining portion providing improved support and also easier movement of the protruding fixing element along the slope surface during rotation of the slotted portion of the fastening mechanism.

In some embodiments, said plurality of apertures are sized such that at least one dimension of said apertures is larger than a width of said slots.

The apertures may simply be one end of the slot configured to receive the fixing element when mounting the pump, however, in some embodiments they may have an increased cross section compared to the slot to facilitate ease of insertion of the fixing element. Where the aperture is larger than the slot, the slot may be sized to be smaller than a dimension of the retaining portion of the protruding fixing element, so that the slot acts to retain the pump. In other embodiments there may be additional retaining elements that form part of the fastening mechanism and serve to retain the pump in position against the vacuum chamber.

In some embodiments, said fastening mechanism comprises said inlet flange, said plurality of apertures on said inlet flange comprising said plurality of slots each extending from said plurality of apertures, said pump being rotatable between said mounting position and said sealing position when mounting said pump to a vacuum system.

In some cases the fastening mechanism may comprise the inlet flange itself with the apertures and slots being provided within the inlet flange such that in some embodiments no additional fastener mechanism is required on the pump itself, and it can simply be mounted on the suitably shaped protruding elements extending from the vacuum chamber with in some embodiments the slots sized to retain the pump once aligned with the protruding fixing elements. In some embodiments, the slots in the flange is used in conjunction with additional retaining and/or biasing elements.

In other embodiments, said fastening mechanism comprises a fastener mounted around an outer surface of said vacuum pump adjacent to said inlet flange, said fastener comprising: a plurality of apertures and said plurality of slots, said plurality of slots each extending from a same side of said plurality of apertures; wherein said fastener is mounted to be rotatable about said outer surface of said pump between a mounting position in which said plurality of apertures on said fastener are aligned with said plurality of flange apertures on said flange and a sealing position in which a portion of said plurality of slots are aligned with said plurality of apertures on said flange.

The fastening mechanism may be a fastener that is mounted around an outer surface of the pump adjacent to the inlet flange. This allows retro fitting to existing components and it also allow a fastener mechanism to be provided that does not affect the flange's configuration. This can be advantageous as the inlet flange may be configured to provide certain safety features particularly where for example the pump is a turbomolecular pump and thus, providing a fastening mechanism that does not interfere with these can have advantages.

In some embodiments, said fastener comprises a ring and said slots extend in a circumferential direction parallel to a circumference of said ring, so that protruding fixing elements passing through said fastener apertures move from said plurality of fastener apertures along said plurality of slots on rotation of said fastener from said mounting position to said sealing position.

In some embodiments, said fastening mechanism comprises a plurality of retainers corresponding to said plurality of protruding fixing elements, said plurality of retainers being formed of a material that is softer than a material forming a portion of said fastening mechanism comprising said slots and being configured to be mounted between said enlarged portion of said protruding fixing elements and said portion of said fastening mechanism comprising said slots.

Although the pump may be retained in position by sizing the slots so that rotation of the protruding fixing element to align with the slot allows the slot to inhibit the enlarged retaining end of the fixing element to pass through it, this may have the disadvantage of wear on the fastener or flange having the slots as they move against the enlarged retaining end of the fixing element. One alternative to this is to provide retainers that are mounted on the enlarged retaining ends and are formed of a softer material, such that on rotation it is these components that wear preferentially to the pump flange or fastener. These components can be replaced. Example materials could be fixing elements and fasteners that are an alloy steel, while the retainers are stainless steel, alternative materials for the retainers may be aluminium or plastic.

In some embodiments, said plurality of retainers each comprise a side wall partially surrounding an aperture, said side wall comprising an opening configured such that said corresponding protruding fixing element can be pushed through said opening on mounting of said retaining element to said protruding fixing element, at least one dimension of said aperture being smaller than a corresponding dimension of said enlarged retaining portion of said protruding fixing element.

The retainers may have a washer, circlip type shape allowing them to be pushed onto the protruding fixing element.

In some embodiments the retainers are mounted between the component comprising the slots and the enlarged retaining portion of said protruding fixing elements. In some embodiments, the side wall of the retainers comprise an elongated reduced width portion that is configured to extend into said slot when mounted to said fastening mechanism. This arrangement allows the retainers to be held in position.

In some embodiments, said fastening mechanism comprises a retaining element comprising a plurality of apertures for receiving said plurality of protruding fixing elements, each of said plurality of apertures in said retaining element comprise a receiving portion and a reduced sized retaining portion, said retaining element being rotatable between a mounting position where said receiving portions of said apertures are aligned with said protruding fixing elements and a retaining position where said retaining portions of said apertures are aligned with said protruding fixing elements, at least one dimension of said retaining portion being smaller than a corresponding dimension of said enlarged retaining portion of said protruding fixing element.

In some embodiments, rather than sizing the slots to retain the pump, or using retainers in the form of softer material washers, the fastening mechanism may comprise a retaining element having apertures with an increased sized receiving portion that is aligned with the protruding fixing elements on mounting and a reduced sized retaining portion that aligns with these elements in the retaining position.

In some embodiments, the retaining element is a ring element, in other embodiments it may be formed of several curved components.

In some embodiments, said fastening mechanism comprises a biasing element comprising a plurality of apertures for receiving said plurality of protruding fixing elements, at least a portion of at least one surface of said biasing element being sloped, such that portions of said biasing element are thicker around said apertures and are thinner away from said apertures.

In addition to retaining the pump, the fastening mechanism may also comprise a biasing function for biasing the pump towards the vacuum chamber and thereby improve the sealing between the two. This may be in the form of a biasing element that has sloped surfaces such that relative rotational movement between another portion of the fastening mechanism and this element pushes the pump towards the chamber.

In some embodiments, said retaining element and said biasing element are a same element.

In some embodiments, said fastener is configured to be mounted between said biasing element and said flange of said pump. In some embodiments, said sloped surface of said biasing element is configured to face said surface of said fastening mechanism comprising said sloped portions surrounding each of said slots.

In some embodiments. said fastener and said biasing element are configured such that when said apertures are aligned a combined thickness of said fastener and said biasing element is reduced and on rotation of at least one of said fastener and biasing element to a retaining position said combined thickness is increased.

Where the fastening mechanism has sloped portions around each of the slots, then mounting the biasing element so that its sloped surfaces face the sloped surfaces around the slots, allow the thickness of the fastening mechanism to vary as the slotted portion of the mechanism is rotated relative to the other elements.

In some embodiments, said sloped surface of said biasing element and said surface of said fastening mechanism which it faces are coated with a low friction coating.

Rotation of the biasing element can be eased and wear reduced by the use of low friction coatings.

In some embodiments, said fastening mechanism further comprises an intermediate element comprising axial protrusions extending from at least one surface, said fastening mechanism being configured such that on rotation of said intermediate element relative to other elements of said fastening mechanism said axial protrusions travel along one of said sloped surfaces of said fastening mechanism, such that a width of said fastening mechanism changes on said relative rotation.

An alternative or addition to a low friction coating is to provide an intermediate element where the contact surface area is reduced by using protrusions. These also allow the width of the fastening mechanism to vary on relative rotation of the intermediate element on a sloped surface as only the protruding portion of the surface contacts the slope.

In some embodiments, said intermediate element comprises said slots and is configured to rotate between a mounting position where a combined thickness of said fastening mechanism is reduced to a retaining position where said combined thickness is increased.

In some embodiments, said intermediate element is mounted between the pump flange and retaining element, in other embodiments the intermediate element is mounted between a biasing element and retaining element. In some embodiments, the intermediate element is ring shaped.

In some embodiments, said axial protrusions comprises rolling elements.

In order to reduce friction and wear on rotation of the slotted component it may be advantageous for the protrusions to be rolling elements such as wheels.

In some embodiments, at least one of said fastener, biasing, intermediate and retaining elements comprises a plurality of articulated sections. In other embodiments they may be formed of discrete curved components.

The fastener, biasing, retaining and intermediate elements are configured to be mounted around the pump adjacent to the flange and in some embodiments, this is done by providing them as a plurality of articulated sections which can be wrapped around the outer surface of the pump. In some embodiments the articulated sections may comprise one aperture and one slot or they may each comprise a plurality of apertures and slots.

In some embodiments, each articulated section is curved.

In order for the articulated section to wrap around the outer surface of the flanged pump, the articulated sections may be curved. It should be noted that the elements may be formed of a flexible material in some embodiments and this would not require articulated sections, however in other embodiments curved articulated sections are provided and these allow the element to be formed of a rigid material such as metal that is resistant to heat and is robust and is still able to wrap around and take the form of the component.

In some embodiments, opposing ends of said fastener, retaining, biasing or intermediate element comprise attachment means for attaching said opposing ends together to form a fastener ring.

One way of mounting a fastener around a flange is to attach opposing ends of the fastener together to form a fastener ring. In this way, the fastener can be wrapped around a flanged pump after manufacture of the pump and held in place with the attachment means.

In some embodiments, said slots extend in a circumferential direction parallel to a circumference of said flange.

The slots should be directed to allow protruding fixing elements to travel along the slots on rotation of the fastener. Where a fastener forms a fastening ring, the slots may extend in a circumferential direction parallel to the circumference of the fastening ring such that rotation of the fastening ring allows protruding fixing elements retained within the slots to move along the lengths of the slots.

In some embodiments, said pump comprises an anti-rotation device for impeding rotation of at least one of said fastener, biasing, retaining and intermediate element by resisting movement of said protruding fixing element within said slot when said pump to said vacuum chamber.

Rotating the fastening mechanism allows the pump to be biased and/or retained against the vacuum chamber and thus, resisting rotation once mounted is desirable. In order to inhibit the pump from becoming detached or not biased against the vacuum system during operation it may be advantageous to provide some anti-rotation device to inhibit rotation when the fastening mechanism is in the sealing position.

In some embodiments, said anti-rotation device comprises: apertures in opposing side walls of at least one of said fastener, biasing, retaining and intermediate element and a pin, said apertures are radially aligned when said fastening mechanism is in said sealed position and provide a passage from an outer to an inner surface through said slot, said apertures being configured to receive said pin, said pin impeding a protruding fixing element received within said slot in said sealing position from moving past said pin.

One simple yet elegant way of inhibiting rotation is to use a pin that extends between apertures in side surfaces and resists movement of the protruding fixing element within the slot such that is held within the sealing position. In some embodiments the protruding fixing elements comprise bolts.

In other embodiments, said anti-rotation device comprises: at least one insert for mounting within said slot, said insert abutting against said protruding fixing elements and against an end of said slot, thereby inhibiting movement of said protruding fixing element.

An alternative way of holding the fastener in place is to use an insert that is configured to be mounted within the slot and abut against the protruding fixing element and against the opposing end of the slot thereby holding the protruding fixing element in place. This may be a stronger way of holding the protruding fixing element in place and an insert may be used in one or more of the slots to provide an effective anti-rotation device.

In some embodiments, said insert comprises a portion for extending under and supporting said retaining portion.

It may be advantageous for a portion of the insert to extend under and support a surface of the retaining portion which extends out from the fastener receiving portion. This can help support the protruding fixing element, hold it in place and inhibit movement of the protruding fixing element both circumferentially and axially.

In some embodiments, said fastener comprises a surface for mating with said flange of said pump and an opposing surface, said opposing surface comprising at least one drive interface for receiving a tool for rotating said fastener between said mounting and sealing positions.

In order to provide the rotation of the fastener between the mounting position and the sealing position, it may be advantageous for it to have at least one drive interface for receiving a tool for rotating the fastener. The tool can rotate the fastener in one movement rather than individual protruding fixing elements having to be separately tightened as in the conventional mounting method.

In some embodiments, the vacuum pump comprises a turbomolecular pump, in others a cryopump while in still others a Getter pump. In some embodiments the vacuum chamber comprises a vacuum chamber within a semiconductor processing tool. In some embodiments the outer surface adjacent to the flange around which the fastener is wrapped has a cylindrical form.

Turbomolecular pumps are often used in vacuum systems such as semiconductor manufacturing systems and are mounted within confined spaces and operate under challenging conditions. Thus, the fastening mechanism of embodiments is particularly applicable to turbomolecular pumps.

A second aspect provides a vacuum system comprising a vacuum system comprising a vacuum chamber comprising an outlet comprising a plurality of protruding fixing elements extending around said outlet towards an exterior of said chamber and a vacuum pump according to a first aspect, said vacuum pump being mounted to said vacuum chamber by said plurality of protruding fixing elements extending through said apertures on said inlet flange of said vacuum pump and said slots of said fastening mechanism.

A third aspect provides a method of mounting a flanged vacuum pump according to a first aspect, to a vacuum chamber comprising a plurality of protruding fixing elements extending around an outlet, said method comprising: aligning apertures in the fastening mechanism of the vacuum pump with the protruding fixing elements; sliding the aligned apertures over the protruding fixing elements; and rotating a portion of the fastening mechanism comprising the slots so that the protruding fixing elements slide within the slots in the fastening mechanism.

A further aspect provides a kit for mounting a flanged pump to a vacuum chamber, said kit comprising: a plurality of bolts configured for mounting in a plurality of bolt receiving holes located around a fluid opening in said vacuum chamber, said bolts comprising an attaching end portion for mounting in and attaching to said bolt receiving holes, a fastener receiving portion and an enlarged retaining portion remote from said attaching end portion, said fastener receiving portion having at least one dimension that is smaller than a corresponding dimension of said retaining portion; and a fastening mechanism for mounting to said flanged pump, said fastening mechanism comprising: a plurality of apertures said plurality of apertures being sized such that said retaining portion can pass through said apertures; and a plurality of slots each extending from a same side of said plurality of apertures; wherein said fastening mechanism is configured to be mounted to said flanged pump by wrapping said fastening mechanism around an outer surface of said flanged pump adjacent to said flange such that at least a portion of said fastening mechanism comprising said slots is rotatable about said outer surface between a mounting position in which said plurality of apertures are aligned with said plurality of bolt receiving holes and a sealing position in which a portion of said plurality of slots are aligned with said plurality of bolt receiving holes.

Features of embodiments of the first aspect may be included in the second, third and further aspects where appropriate and in addition to those examples explicitly disclosed.

Embodiments provide a kit that can be used to mount flanged vacuum pumps to a vacuum chamber. The kit comprises specially adapted bolts which have a retaining end portion which is enlarged compared to the central fastener receiving portion and which is located at the opposite end of the bolt to the attaching portion which is configured to attach to the vacuum chamber. The attaching portion may be a threaded portion or it may have some other means for attaching to the vacuum chamber.

This arrangement allows the bolts to be attached to the vacuum chamber once. The flanged vacuum pump can be mounted on and removed from the bolts without the need to undo them. This is done with the use of a fastening mechanism that is mounted to the flanged vacuum pump by wrapping it around an outer surface adjacent to the flange. The fastening mechanism comprises apertures and slots extending from them and the slotted portion is mounted so that it can rotate. The bolts and apertures are sized so that the retaining end portion of the bolts can pass through the apertures in the fastening mechanism while in some embodiments, the slots in the fastening mechanism extending from the apertures are sized so that the bolt retaining end portion cannot pass through them. In this way, the fastening mechanism can be mounted to the flanged vacuum pump and rotated to a mounting position where the apertures in the flange and on the fastening mechanism are aligned and the flanged vacuum pump and fastening mechanism can then be slid onto the bolts by passing the bolts through the aligned apertures. The fastening mechanism can then be rotated such that the fastener receiving portion of the bolts slides along the slots in the fastening mechanism.

The slots may be sized to retain the pump, or softer material retainers may be used. Alternatively, a ring-shaped retaining element may be provided in the kit. A biasing effect may be provided with sloped surfaces on a fastener, biasing element or on the retaining element. In some embodiments, an intermediate element with protrusions may be included within the kit.

In this way, the flanged vacuum pump is mounted by a simple motion of sliding the flanged vacuum pump onto the bolts and then rotating some portion of the fastening mechanism. This provides a much simpler mechanism of mounting and detaching the flanged vacuum pump to the vacuum chamber that does not require access around the flanged vacuum pump and can be performed in two relatively simple moves. Furthermore, the kit is provided so that the flanged vacuum pump and vacuum chamber require no adaptation to use this mounting means. This allows safety features designed into the system around the mating surface of the components to remain unchanged by the new mounting system.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

The summary is provided to introduce a selection of concepts in a simplified form that are further described in the detailed description. This summary is not intended to identify key features or essential features of the claimed subject matter, nor is it intended to be used as an aid in determining the scope of the claimed subject matter.

BRIEF DESCRIPTION OF THE DRAWINGS

Embodiments of the present invention will now be described further, with reference to the accompanying drawings, in which.

DETAILED DESCRIPTION

Before discussing the embodiments in any more detail, first an overview will be provided.

Installing pumps such as vacuum pumps to a vacuum system can be challenging. Other related equipment and the tool location creates a challenging environment for installing and swapping the pumps where the pumps are installed directly to the tool. During installation, the pump must be lifted to the mating face and up to twelve bolts installed while holding the pump against the mating face. This creates a dangerous and difficult ergonomic environment for the installers. Furthermore, the bolts are often difficult to reach in some areas depending on the tool.

Embodiments provide a fastener kit for mounting pumps to vacuum systems and in particular, for mounting vacuum pumps to semiconductor tools. The fastener may be built in some embodiments in several detachable parts that can be installed on the pump adjacent to the inlet flange prior to moving the pump into the installation location. Specialised bolts that are pre-installed on the tool can be used, these bolts having heads that fit through holes in the fastener and intermediate portions that slide through a slot on the fastener which slot has a smaller width than the diameter of the head, but a larger width than the diameter of the intermediate portion. The slot edges on the fastener have a raised feature that is angled such that as the fastener is turned the bolt head slides through the slot and up the angled raised surface creating an upward force on the flange of the pump by the fastener as it turns and in this way tensions the bolts. These upward forces provided on turning the ring generate a sealing force for the pump against any seal potentially an O ring on the tool.

In some embodiments there is provided a locking mechanism that may be used to inhibit the ring from backing up once fully turned and becoming detached during operation. This way installation of a pump, perhaps a pump to a system such as a tool can be made faster and safer.

Figure 1:
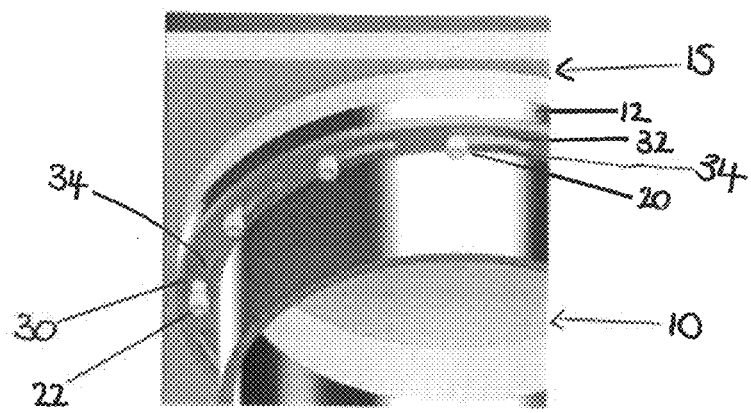
FIG. 1 shows a portion of a pump according to an embodiment attached to a chamber with a fastener.

FIG. 1 shows a portion of a pump 10 for mounting to a vacuum system 15. Pump 10 comprises flange 12 comprising a plurality of apertures (not shown) through which bolts 20 extend. Fastener 30 comprises a ring having apertures 32 which are dimensioned such that the retaining ends 22 of bolt 20 can pass through the apertures and slots 34 which are narrower than the apertures 32 and along which the bolts can slide but through which the retaining ends 22 cannot pass. Thus, once the pump and fastener 30 are mounted on bolts 20, rotation of the fastener 30 from a mounting position where the apertures 32 are aligned with the bolts and the apertures in the flange 12, to a sealing position where the bolts are now aligned with slots 34 is all that is required to install the pump 10 to the vacuum system 15. In effect, the slots 34 have a smaller dimension than the retaining heads 22 and thus, hold the fastener 30 and therefore the pump 10 in place against the vacuum system 15.

Figure 2:
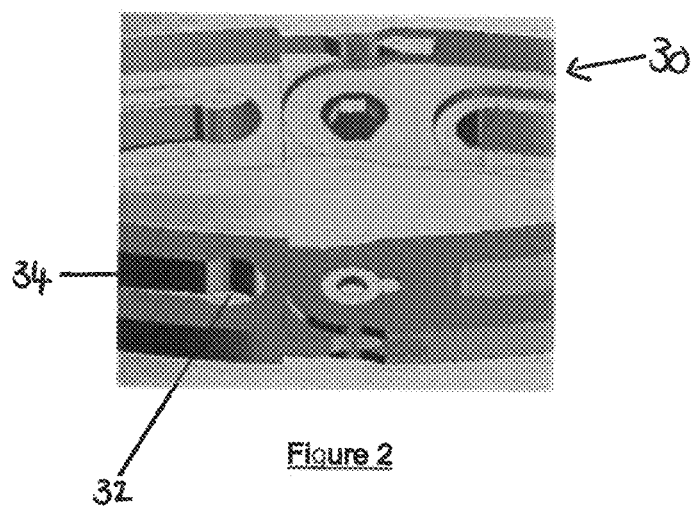
FIG. 2 schematically shows a portion of a fastener ring.

FIG. 2 shows fastener 30 in more detail. Fastener 30 is in this embodiment made up of a plurality of articulated components which are held together by bolts and each of which comprise at least one aperture 32 with a slot extended therefrom 34. Each of the components are curved such that when they are mounted around the pump they form a ring which matches the outer surface of the flange component. The bolts holding the components together allow for some rotational movement of the components allowing the fastener 30 to be wrapped around the outer surface of the pump 10 and then fastened thereto by fastening the two ends of the fastener 30 together to form a ring.

Figure 3:
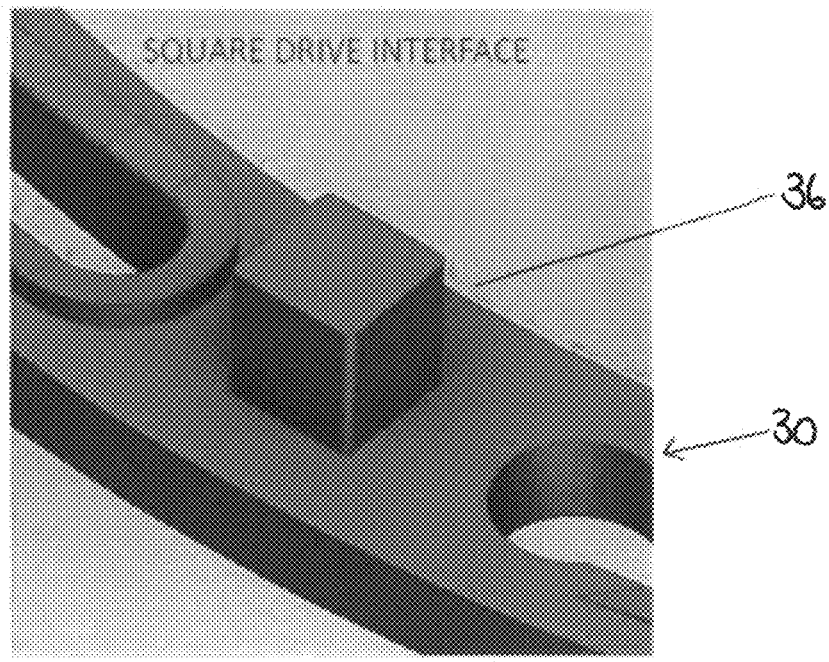
FIG. 3 shows a drive interface on a fastener according to an embodiment.

FIG. 3 shows a portion of fastener 30 having a drive interface 36 for receiving a drive tool for rotating the fastener and moving it from the mounting to the sealing position during installation and form the sealing to the mounting position during swapping of a pump. In this embodiment, the drive interface extends from the surface of the fastener 30. In other embodiments, it may comprise a recess within the fastener.

Figure 4:
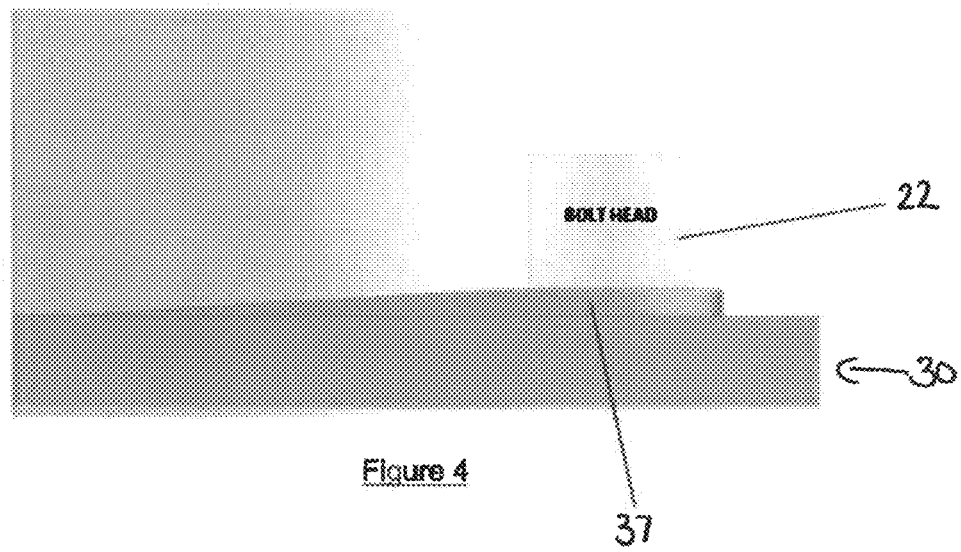
FIG. 4 shows a transverse view of a portion of a fastener with a bolt head and sloped surface.

FIG. 4 shows a side view of a portion of fastener 30 with the bolt head 32 extending through the slot and being held by it. The slot is shown in side view and one can see a sloped surface 37 extending along the side edges of the slot from the aperture end on the left of the diagram to the other end of the slot on the right of the diagram. This slope means that on rotation of the fastening means the bolt head 32 slides along the slope and thus, there is a vertical component to its movement and this pushes the pump towards the vacuum system. Although not shown, the bolt head 22 has a surface that mates with the slope and which is also angled in a corresponding manner allowing for improved support of the bolt head across a greater surface area.

Figure 5:
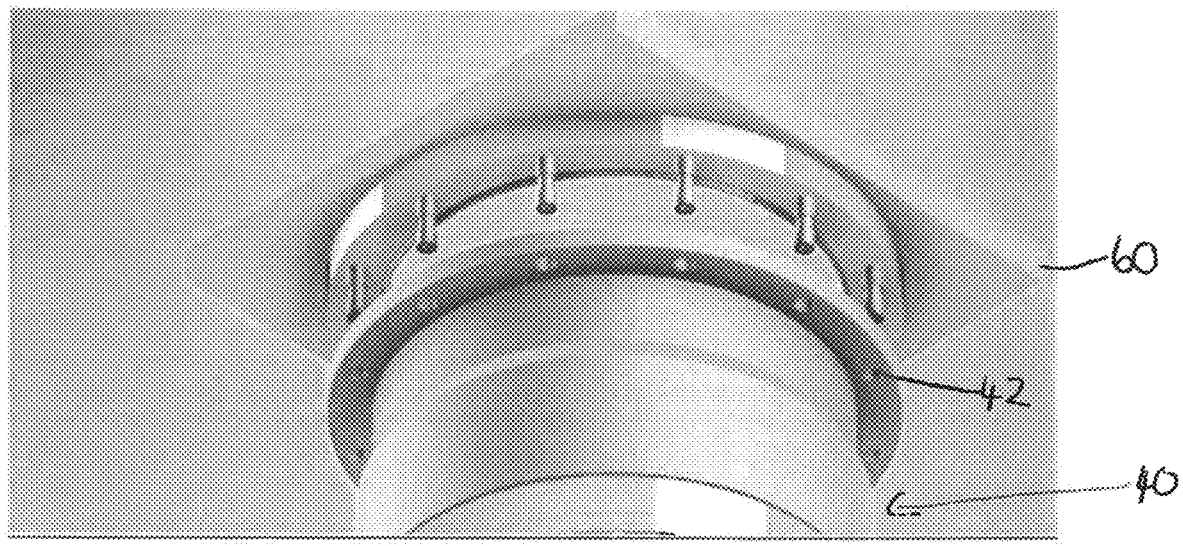
FIG. 5 schematically shows the mounting of a pump to a vacuum chamber outlet.

FIG. 5 schematically shows the mounting of a pump which in this embodiment comprises turbomolecular pump 40 to a vacuum system which in this embodiment comprises the outlet of a vacuum chamber 60. In this embodiment, a plurality of bolts 20 are mounted around the vacuum chamber outlet and these bolts have a contoured surface such that the retaining end 22 has a larger diameter than the intermediate fastener receiving portion 24. The apertures 42 in the flange of the turbo pump are aligned with the bolts such that on mounting the turbo pump the bolts pass through the apertures 42 and the flange of the turbo pump mates with the surface around the vacuum chamber outlet 60.

Figure 6:
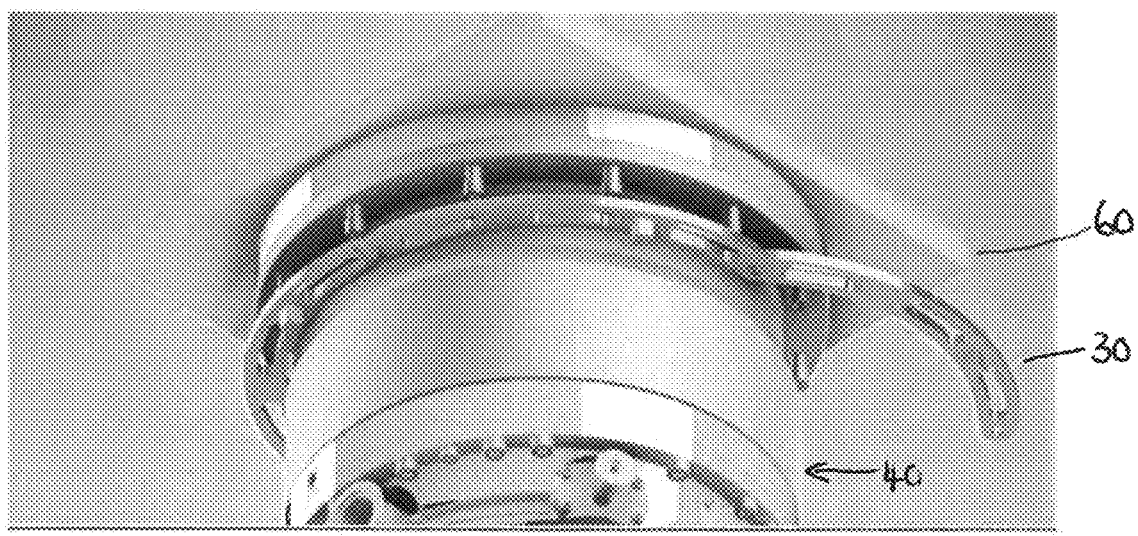
FIG. 6 shows a fastener being wrapped around a pump adjacent to a flange.

FIG. 6 schematically shows how fastener 30 is wrapped around turbo pump 40 of FIG. 5 to provide a means of holding the turbo pump against the vacuum chamber outlet 60. Although the fastener is shown being wrapped around the turbo pump when it is mounted adjacent to the vacuum chamber, this is purely illustrative and generally the fastener will wrapped around and attached to the pump before it is mounted to the vacuum chamber.

The fastener 30 is an articulated fastener which is wrapped around the outer surface of the turbo pump 40 adjacent to the flange and the ends of which are secured together with bolts. It is mounted so that it can rotate around the outer surface which enables it to lock the turbo pump in place.

Figure 7:
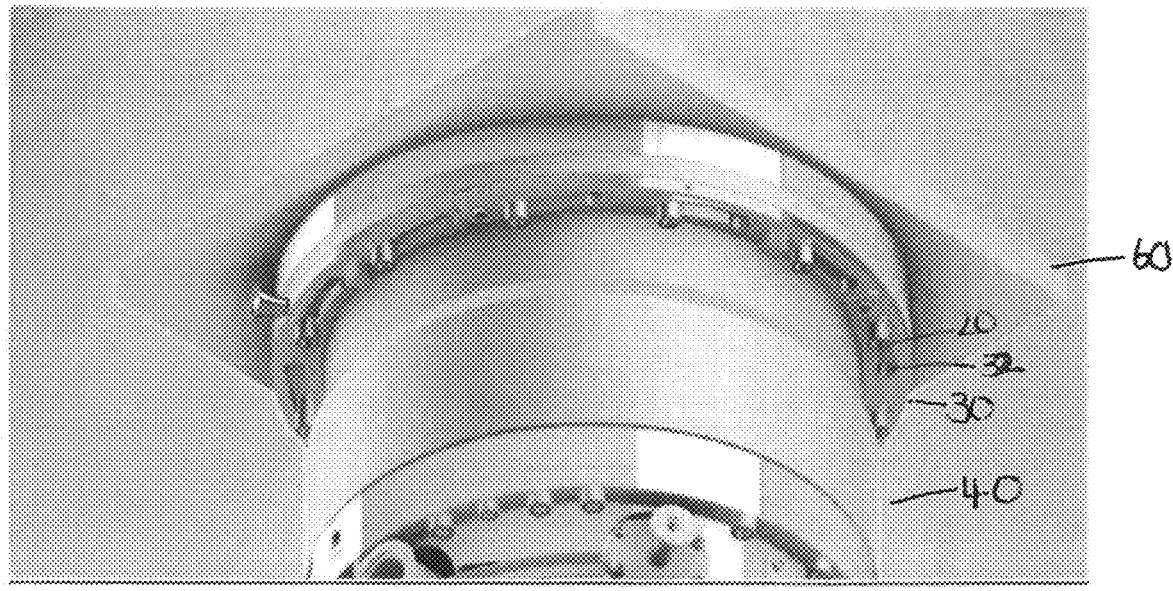
FIG. 7 shows a pump attached to a chamber using a fastener according to an embodiment.

FIG. 7 shows the turbo pump 40 mounted to the vacuum chamber outlet 60 by fastener 30. As can be seen fastener 30 abuts against the flange of the turbo pump 40 and pushes it against vacuum chamber outlet 60. The bolts 20 are at one end of the slot, the fastener 30 having been rotated from the mounting position where the apertures 32 in the fastener are aligned with the bolts, to the position where the bolts are at the other end of the slot and where the retaining end is held vertically by the slot and the fastener is inhibited from rotation by an anti-rotation device 70. In this embodiment the anti-rotation device comprises a pin which goes through holes on the side surfaces of the fastener and resists rotation of the fastener from the sealing position back towards the mounting position. In this embodiment, there is a single pin, in other embodiments there may be more than one pin arranged adjacent to different bolts.

Figure 8:
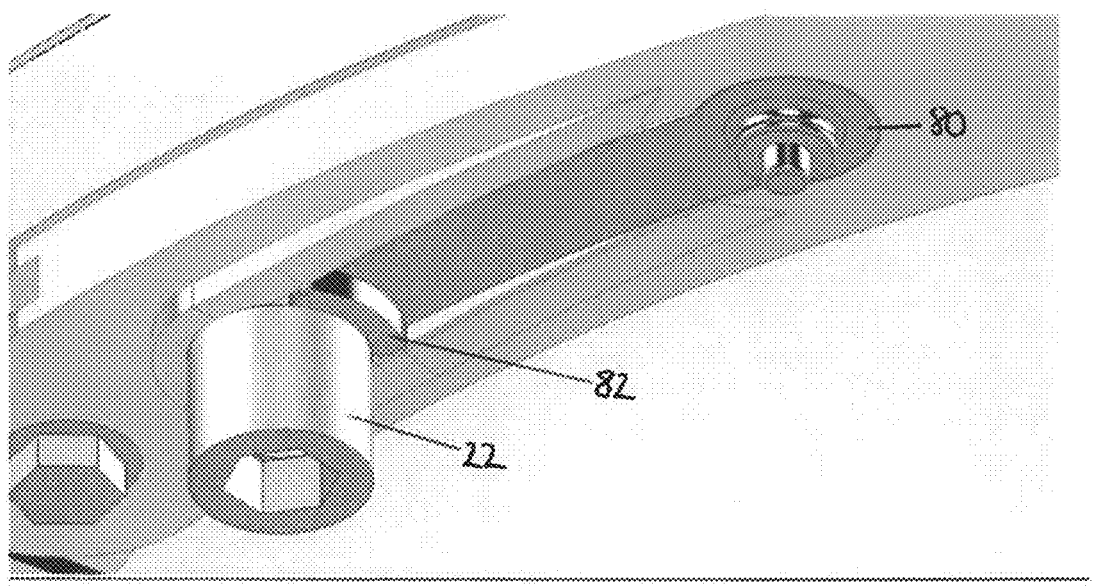
FIG. 8 schematically shows an anti-rotation device according to an embodiment.

FIG. 8 shows an alternative anti-rotation device 80 which has the form of an insert which is inserted into the slot and which holds the bolt in position against one end of the slot. Insert 80 has a raised portion 82 which goes under the enlarged retaining end 22 of the bolt and helps to hold it and provides support for the end of the bolt.

Figure 9:
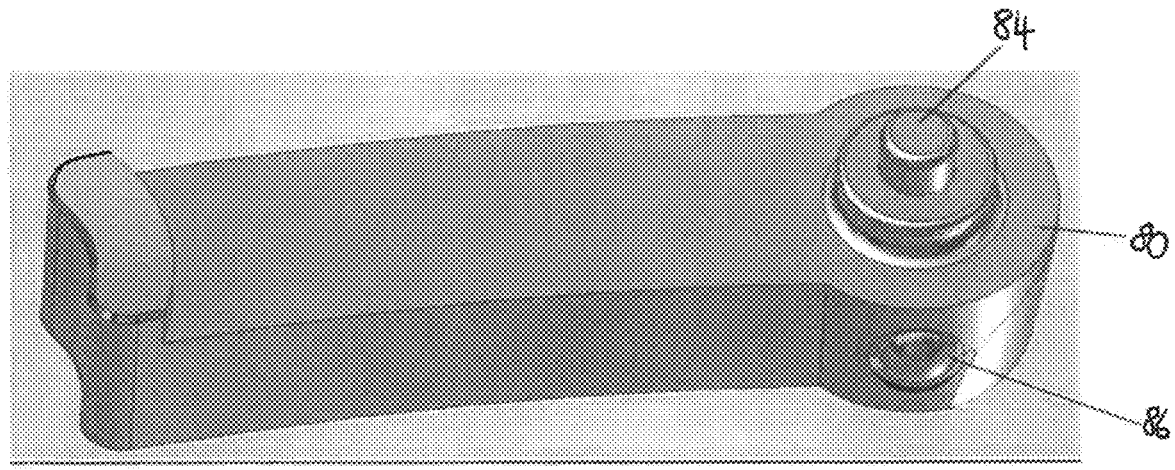
FIG. 9 shows the anti-rotation device according to an embodiment in more detail.

FIG. 9 shows insert 80 in more detail. There are ball bearings 86 which extend out from the side surfaces and help retain the insert in place within the slot. Button 84 can be depressed to release the ball bearings and release the insert 80 from the slot.

In some embodiments, there may be a single insert 80 for retaining the fastener in the sealing position, while in other embodiments there may be several in different slots.

Figure 10:
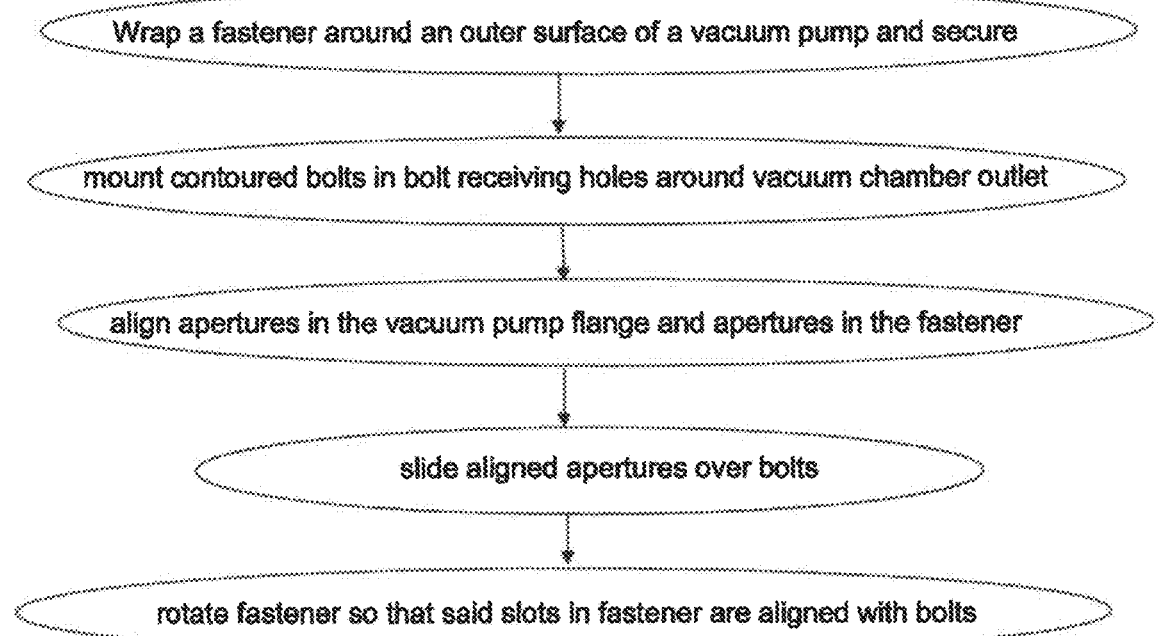
FIG. 10 shows a flow diagram illustrating steps in a method of mounting a pump according to an embodiment.

FIG. 10 shows a flow diagram illustrating steps in a method of mounting a vacuum pump to a vacuum chamber according to an embodiment. In one step a fastener is wrapped around an outer surface of the vacuum pump and secured in place. In another step contoured bolts are mounted in bolt receiving holes around the vacuum chamber outlet. These two steps may be performed in any order. Once these steps have been performed then the apertures in the vacuum pump flange and the apertures in the fastener are aligned and these aligned apertures are slid over the bolts extending from the vacuum chamber such that the pump is in position adjacent to the vacuum chamber outlet. The fastener is then rotated so that the slots in the fastener are aligned with the bolts and where the slots have a reduced width compared to the end of the bolts, the pump is held in position by the slots. In other embodiments, retainers may be placed between the bolt heads and the slots to retain the pump in position. In some embodiments there are slopes on the surface of the slots and the pump is pushed against a vacuum chamber during rotation of the fastener and this helps provide an effective seal between the vacuum chamber and pump. In some embodiments an anti-rotation device is then inserted such that the bolt is inhibited from moving back along the slot from the sealing to the mounting position which movement would allow the pump to become detached during use.

FIG. 11 shows several views of a fastening mechanism having a fastener 30 and a retaining element 38 according to an embodiment.

Figure 11A:
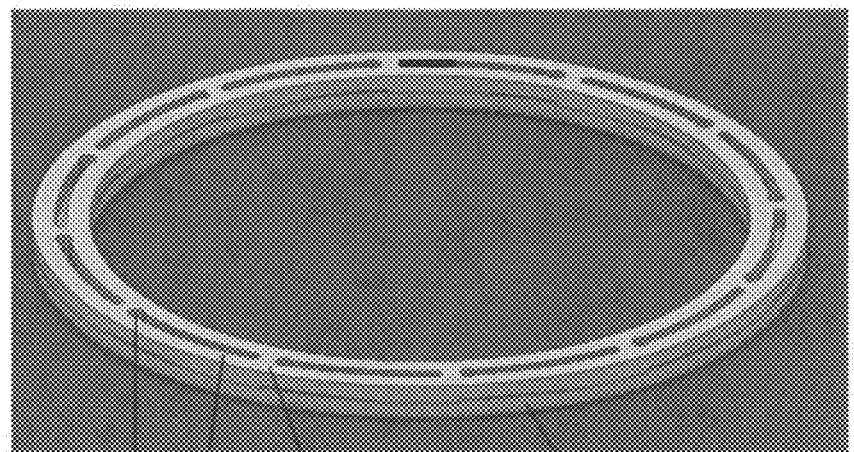
FIGS. 11A-C show a fastening mechanism according to an embodiment.
Figure 11B:
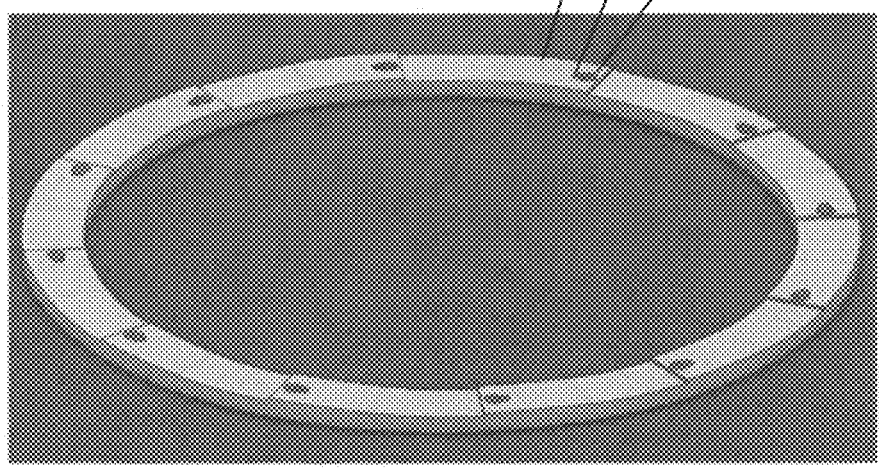

FIG. 11A shows the fastener 30 that is configured to be mounted adjacent to the flange of the pump and which comprises slots 34 extending from apertures 32. The apertures 32 receive the bolts that extend through the flange of the pump and are attached to the vacuum chamber when the pump is mounted to the vacuum chamber. The slots allow the fastener 30 to rotate with the bolts moving along the slots. The fastening mechanism also comprises a retaining element 38 which is shown in greater detail in FIG. 11B. Retaining element 38 comprises apertures 32 each of which has a reduced sized aperture portion 39 which is the retaining portion of the aperture.

When mounting the pump to the vacuum chamber, the apertures 32 in the fastener 30 and retaining element 38 are aligned and the bolts extending from the vacuum chamber pass through these apertures. The fastener 30 and retaining element 38 are then rotated. Rotation of the retaining element 38 causes the reduced sized portion 39 of the apertures to be aligned with the bolts such that the enlarged end of the bolt cannot pass through this smaller aperture and the pump is held in position. Rotation of the fastener 30 causes the bolts to travel along the slots and the sloped surfaces of the fastener 30 and the retaining element 38 move over each other such that rather than the thicker and thinner portions being aligned so that the fastening mechanism has a reduced thickness the thicker portions are aligned giving an increased thickness to the fastening mechanism which provides a biasing force on the pump biasing it against the vacuum chamber and improving the sealing.

Figure 11C:
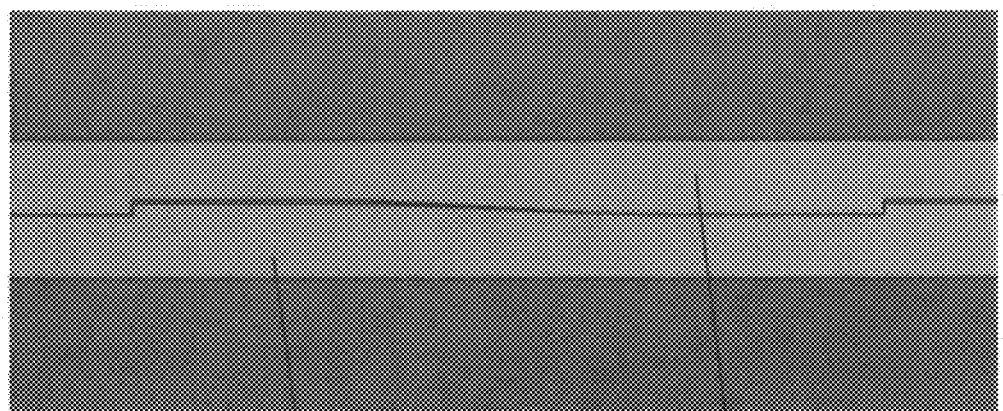

FIG. 11C shows the alignment of the fastener 30 and the retaining elements 38 in the mounting position when the sloped sections fit together and a reduced width of the fastening mechanism is provided. Relative rotation of these two elements allows the increased width portions to be aligned and provides for an increased width of the fastening mechanism. In order to provide ease of rotation, the facing surfaces may be coated with a low friction coating such as Teflon.

Figure 12A:
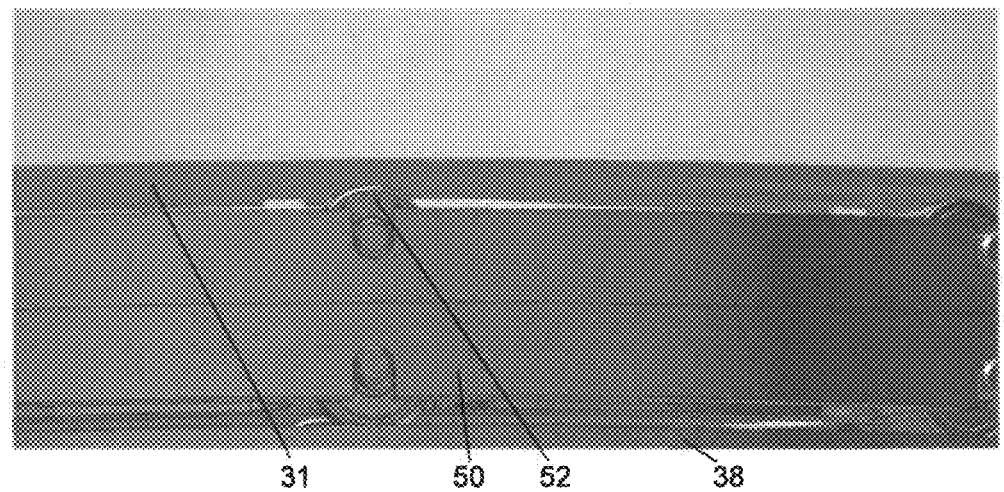
FIGS. 12A and 12B shows a fastening mechanism with an intermediate element.

FIG. 12A shows an alternative embodiment of a fastening mechanism with an intermediate element 50 mounted between a biasing element 31 and a retaining element 38. In other embodiments, the intermediate element may be mounted between a fastener 30 and a retaining element 38. In still other embodiments it may be mounted between the flange and a retaining and biasing element.

Intermediate element 50 has protrusions which in this embodiment are in the form of rolling elements or wheels 52 which are configured to travel over the surfaces of the biasing element 31 and the retaining element 38 on rotation of the intermediate element 50. This allows for low friction rotation of this element. Biasing element 31 has an undulating surface such that rotation of the intermediate element from the lower thickness area to the higher thickness area increases the width of the fastening mechanism and may be used to bias the vacuum pump against the flange.

Figure 12B:
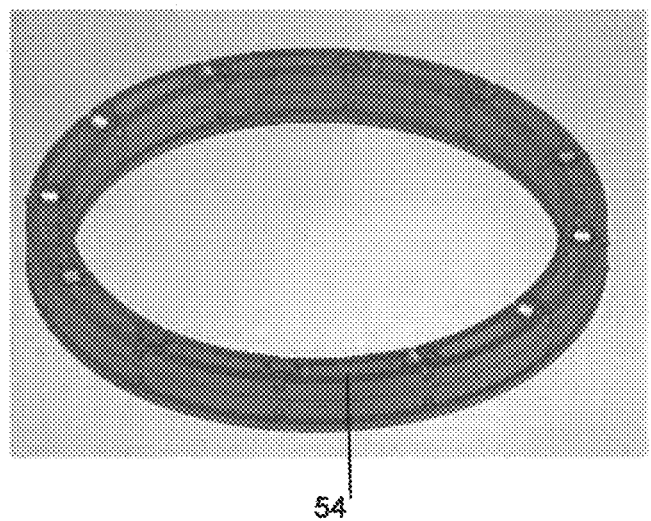

FIG. 12B shows the intermediate element 50 and in particular the slots 54 which extend through the intermediate element and allow rotation of this element relative to the vacuum pump, with the bolts that fix the vacuum pump to the vacuum chamber traveling within these slots. In an alternative embodiment, where a fastener 30 is used rather than a biasing element 31 then slots may be within the fastener 30 rather than the intermediate element 50 and the fastener may rotate relative to the intermediate element. In some embodiments, both the biasing element and the retaining element have correspondingly sloped surfaces.

Figure 13:
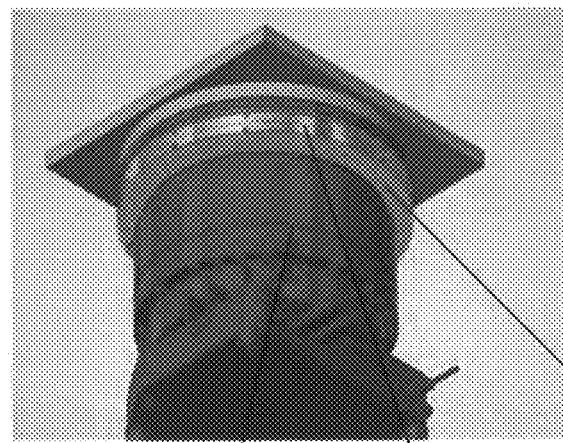
FIG. 13 shows a pump with a fastening mechanism attached.

FIG. 13 shows a pump 10 with a fastening mechanism in place. In this embodiment the fastening mechanism comprises a retaining element 38 and an intermediate element 50.

Figure 14A:
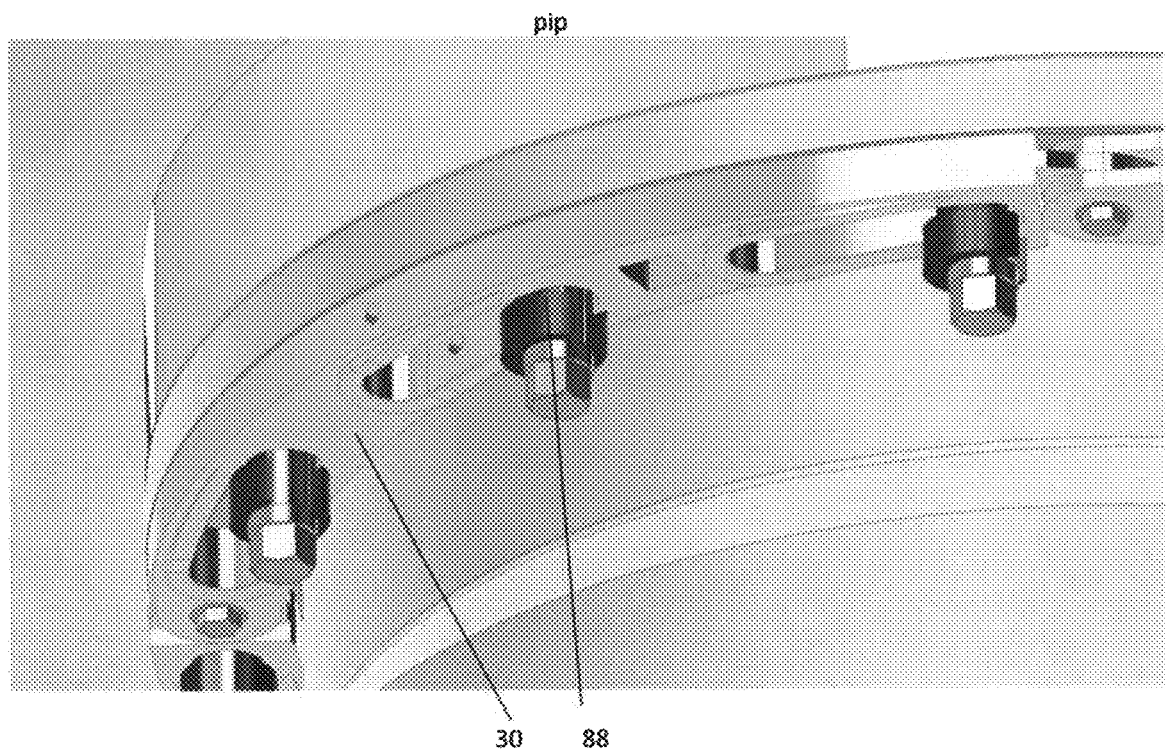
FIG. 14A shows a fastening mechanism with retainers.

FIG. 14A shows an alternative embodiment that is similar to that of FIGS. 1 to 7, but where the slot has a constant cross section that is the same as the aperture for receiving the bolt and thus, does not act to retain the pump in position, rather retainers in the form of washers 88 are used. These are mounted on the bolt heads and provide a surface for the fastener to rotate on. The material of the washers is selected to be softer than the material of the bolts or fastener so that any wear occurs preferentially on these washers. This allows the washers to be replaced and extends the life of the other components. The washers may also be selected to be a material with a low coefficient of friction.

Figure 14B:
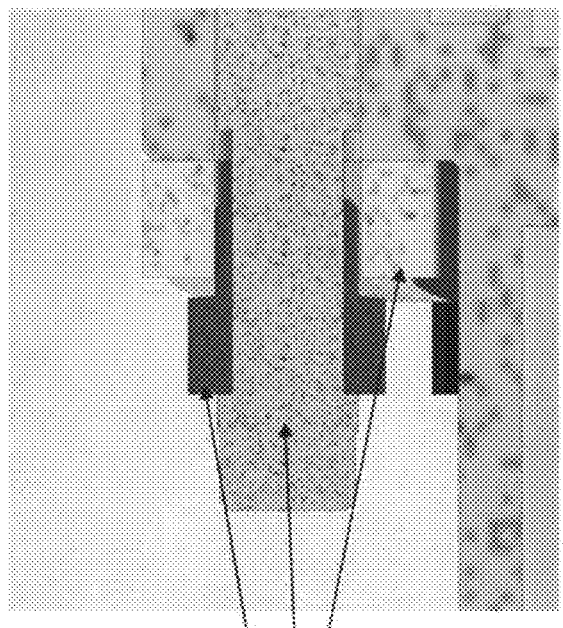
FIGS. 14B and C shows the retainers.
Figure 14C:
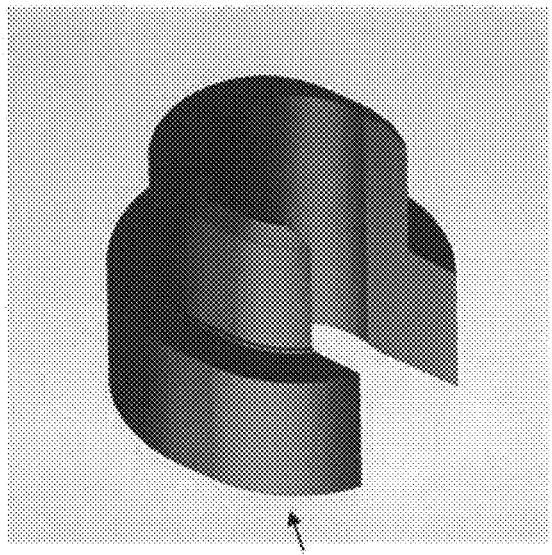

FIG. 14B shows the retainer 88 mounted in position on the lip of the enlarged retaining end 22 of the fixing element or bolt. The retainer has an elongated thinner portion which extends into the slot on fastener 30 and helps maintain it in position. In some embodiments the retainer 88 does not have this portion. The edge of the slot of fastener 30 rests on the lip of retainer 88 between the thicker and thinner portions, this lip can be seen more clearly in FIG. 14C. FIG. 14C also shows the shape of the retainer, such that the side walls comprise an opening allowing the retainer to be pushed onto the bolts from the side.

Although illustrative embodiments of the invention have been disclosed in detail herein, with reference to the accompanying drawings, it is understood that the invention is not limited to the precise embodiment and that various changes and modifications can be effected therein by one skilled in the art without departing from the scope of the invention as defined by the appended claims and their equivalents.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

The invention claimed is:

1. A vacuum pump comprising:
an inlet flange for connecting to a vacuum chamber, said inlet flange comprising a plurality of apertures for receiving a plurality of protruding fixing elements extending from said vacuum chamber, said protruding fixing elements comprising an enlarged retaining portion at an end remote from said vacuum chamber and a fastener receiving portion having at least one radial dimension that is smaller than a corresponding dimension of said enlarged retaining portion;
a fastening mechanism mounted around an outer surface of said vacuum pump adjacent to said inlet flange and comprising a plurality of slots each extending from a same side of a plurality of apertures; wherein
said fastening mechanism is configured to be rotatable between a mounting position in which said apertures of said fastening mechanism are aligned with said protruding fixing elements and said plurality of flange apertures and a sealing position in which said slots are aligned with said protruding fixing elements and said plurality of apertures on said flange.

2. The vacuum pump according to claim 1, wherein at least a portion of a surface of said fastening mechanism surrounding each of said slots is sloped, such that said at least a portion of said fastening mechanism is thinner closer to said aperture and thicker further from said aperture.

3. The vacuum pump according to claim 2, wherein a surface of said retaining portion of said protruding fixing elements extending radially beyond said fastener receiving portion is sloped, an angle of said slope corresponding to an angle of said sloped surface surrounding said slots.

4. The vacuum pump according to claim 1, said plurality of apertures of said fastening mechanism being sized such that at least one dimension of said apertures is larger than a width of said slots.

5. The vacuum pump according to claim 1, wherein said fastening mechanism comprises a ring and said slots extend in a circumferential direction parallel to a circumference of said ring, so that protruding fixing elements passing through said apertures move from said plurality of apertures along said plurality of slots on rotation of said fastening mechanism from said mounting position to said sealing position.

6. The vacuum pump according to claim 1, wherein said fastening mechanism comprises a plurality of retainers corresponding to said plurality of protruding fixing elements, said plurality of retainers being formed of a material that is softer than a material forming a portion of said fastening mechanism comprising said slots and being configured to be mounted between said enlarged portion of said protruding fixing elements and said portion of said fastening mechanism comprising said slots.

7. The vacuum pump according to claim 6, wherein said plurality of retainers each comprise a side wall partially surrounding an aperture of said fastening mechanism, said side wall comprising an opening configured such that said corresponding protruding fixing element can be pushed through said opening on mounting of said retaining element to said protruding fixing element, at least one dimension of said aperture being smaller than a corresponding dimension of said enlarged retaining portion of said protruding fixing element.

8. The vacuum pump according to claim 1, wherein said fastening mechanism comprises a retaining element comprising a second plurality of apertures for receiving said plurality of protruding fixing elements, each of said second plurality of apertures in said retaining element comprise a receiving portion and a reduced sized retaining portion, said retaining element being rotatable between a mounting position where said receiving portions of said second plurality of apertures are aligned with said protruding fixing elements and a retaining position where said retaining portions of said second plurality of apertures are aligned with said protruding fixing elements, at least one dimension of said retaining portion being smaller than a corresponding dimension of said enlarged retaining portion of said protruding fixing element.

9. The vacuum pump according to claim 8, further comprising an intermediate element comprising axial protrusions extending from at least one surface, said fastening mechanism being configured such that on rotation of said intermediate element relative to other elements of said fastening mechanism said axial protrusions travel along sloped surfaces of said fastening mechanism, such that a width of said fastening mechanism changes on said relative rotation.

10. The vacuum pump according to claim 9, said plurality of slots are located in the intermediate element and the intermediate element is configured to rotate between a mounting position where a combined thickness of said fastening mechanism is reduced to a retaining position where said combined thickness is increased.

11. The vacuum pump according to claim 9, wherein said axial protrusions comprise rolling elements.

12. The vacuum pump according to claim 1, wherein said fastening mechanism comprises a biasing element comprising a plurality of apertures for receiving said plurality of protruding fixing elements, at least a portion of at least one surface of said biasing element being sloped, such that portions of said biasing element are thicker around said apertures and are thinner away from said apertures.

13. The vacuum pump according to claim 12, wherein said fastening mechanism further comprises a fastener mounted around an outer surface of said vacuum pump adjacent to said inlet flange, said fastener comprising:
said plurality of apertures of the fastening mechanism and said plurality of slots of the fastening mechanism,
wherein said fastener is mounted to be rotatable about said outer surface of said pump between a mounting position in which said plurality of apertures on said fastener are aligned with said plurality of flange apertures on said flange and a sealing position in which a portion of said plurality of slots are aligned with said plurality of apertures on said flange, and
wherein said fastener is configured to be mounted between said biasing element and said flange of said pump.

14. The vacuum pump according to claim 13, wherein at least a portion of a surface of said fastener surrounding each of said slots is sloped, such that said at least a portion of said fastener is thinner closer to said aperture and thicker further from said aperture and wherein said sloped surface of said biasing element is configured to face said surface of said fastener comprising said sloped portions surrounding each of said slots.

15. The vacuum pump according to claim 14, wherein said sloped surface of said biasing element and said surface of said fastener which it faces are coated with a low friction coating.

16. The vacuum pump according to claim 13, wherein said fastener and said biasing element are configured such that when said apertures are aligned a combined thickness of said fastener and said biasing element is reduced and on rotation of at least one of said fastener and biasing element to a retaining position said combined thickness is increased.

17. The vacuum pump according to claim 1, wherein the fastening mechanism comprises a plurality of articulated sections.

18. The vacuum pump according to claim 17, wherein each articulated section comprises at least one aperture and at least one slot.

19. The vacuum pump according to claim 17, wherein each articulated section is curved.

20. The vacuum pump according to claim 1, wherein said vacuum pump comprises a turbomolecular pump.

21. A vacuum system comprising the vacuum chamber and the vacuum pump according to claim 1, said vacuum pump being mounted to said vacuum chamber by said plurality of protruding fixing elements extending through said apertures on said inlet flange of said vacuum pump and said slots of said fastening mechanism.

22. A method of mounting a flanged vacuum pump according to claim 1, to the vacuum chamber comprising the plurality of protruding fixing elements extending around an outlet, said method comprising:
aligning the apertures in the fastening mechanism with the protruding fixing elements;
sliding the aligned apertures over the protruding fixing elements; and
rotating a portion of the fastening mechanism comprising the slots so that the protruding fixing elements slide within the slots in the fastening mechanism.

\* \* \* \* \*